United States Patent [19]

Schmidt

[11] 4,424,451
[45] Jan. 3, 1984

[54] WATER TURBINE

[76] Inventor: Friedrich Schmidt, 7 Harrigan St., Edison, N.J. 08817

[21] Appl. No.: 337,926

[22] Filed: Jan. 8, 1982

Related U.S. Application Data

[63] Continuation-in-part of Ser. No. 103,888, Dec. 17, 1979.

[51] Int. Cl.$^3$ .............................................. F03B 13/10
[52] U.S. Cl. ......................................... 290/54; 415/7; 416/107; 416/119
[58] Field of Search .................................. 290/42–44, 290/53–55; 415/7, 8; 416/84–86, 107, 117, 119, 132 B, 140; 417/334–337

[56] References Cited

U.S. PATENT DOCUMENTS

| | | | |
|---|---|---|---|
| 226,357 | 4/1880 | Saccone | 416/119 |
| 998,446 | 7/1911 | Amy | 416/119 |
| 4,095,422 | 6/1978 | Kurakake | 290/54 |

FOREIGN PATENT DOCUMENTS 304514   1/1929   United Kingdom ................ 416/117

*Primary Examiner*—J. V. Truhe
*Assistant Examiner*—Shelley Wade
*Attorney, Agent, or Firm*—Frederick A. Zoda; John J. Kane

[57] ABSTRACT

The water turbine of the present invention includes a housing defining a generally cylindrical chamber therein defining a laterally extending opening. Rotatably positioned within the chamber is a rotor including a plurality of folding wings or vanes extending outwardly therefrom. Each vane includes a first blade section which is immovably fixed with respect to the rotor hub and a second blade section which is pivotally secured with respect to the first blade section. This pivotal movement of the second blade toward the non-propelling side of the vane is restricted by a stop whereas pivotal movement of the second blade section toward the propelling side of the vane is made possible. A biasing device is included to urge the second blade section into contact with the stop which is the propulsion of the vane. To protect the joined connection between the first and second blade sections a covering means preferably including an expandable and contractable baffle section may be included. With this configuration the inner covering would preferably be of a resilient material to thereby comprise the biasing device. The folding wing design of the rotor allows full operational rotation thereof with the rotor extending perhaps only partially along the laterally extending opening of the housing. The rotor can be of any vertical dimension depending on the normal surrounding environment of the particular water in which a specific turbine is being positioned. In this manner a water turbine device for utilizing the kinetic energy of moving water by transferring it into electrical energy is created.

12 Claims, 6 Drawing Figures

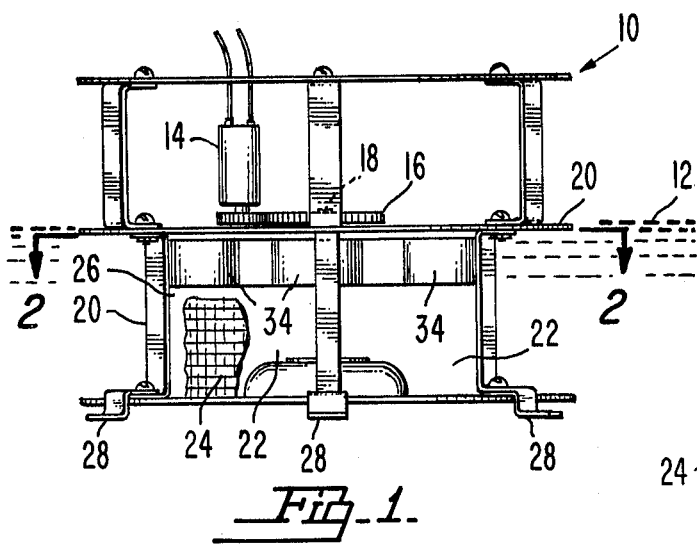
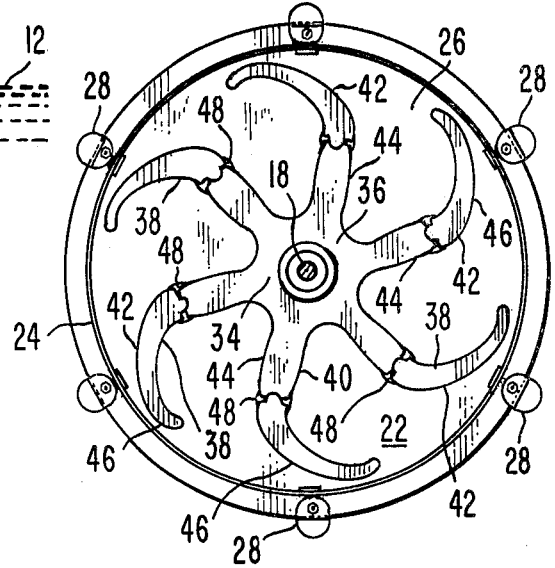
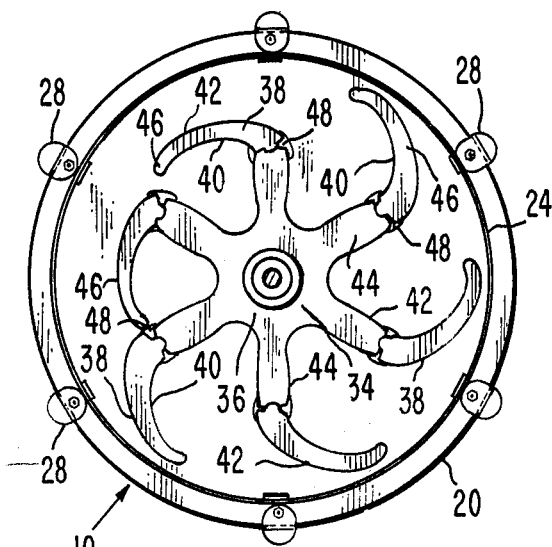
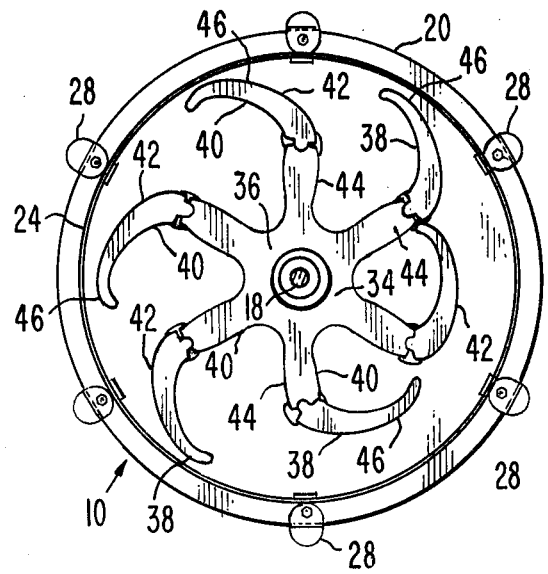
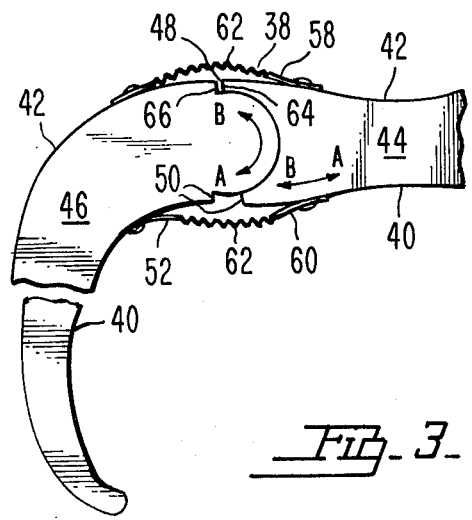
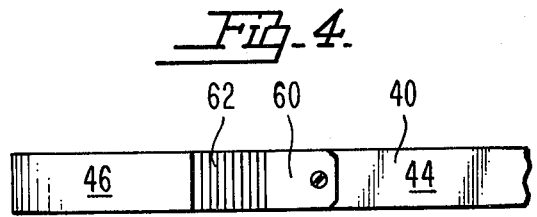

WATER TURBINE

This application is a continuation-in-part of U.S. Ser. No. 103,888 filed Dec. 17, 1979.

BACKGROUND OF THE INVENTION

1. Field of the Invention

The present invention provides a water turbine useful for placement in areas of water not having a predefined current. The present invention is particularly useful in those areas where the water may flow in one direction under certain conditions and may flow in another direction under other conditions. Such areas include areas near shoales or reefs where water currents vary according to the movement of direction of the waves whether it is in or out and also may vary in accordance with the tide. At one time of the day the primary direction of water movement may be in one direction and at another time of the day the water direction may be in the opposite or another direction.

The present invention is also usable in areas having variable depths of water. In particular the greater depth or the greater water movement velocity allows a choice of depth of the rotor of the present invention to be chosen such as to take advantage of those particular local water movement characteristics. It must be appreciated that the ocean is not a river. Water moves in one direction at one time and moves in another direction at a different time. The present invention is particularly adapted to take advantage of this constantly changing tide of water in ocean areas particularly near shore lines.

The present invention provides a novel means for the exploitation of wave power, that is, the kinetic energy always available in the movement of water particularly in the areas of the ocean adjacent to shore lines. Many devices have been conceived to attempt to solve this problem but most of these devices have proved to be too expensive for an economically feasible use or too intricate to be able to be utilized for an extensive period of time without having many maintenance requirements. The present invention provides a simple novel construction which can utilize movement of water coming from any direction to continuously rotate a turbine rotor which is permitted to rotate in the propelling direction only.

2. Description of the Prior Art

Examples of prior art patents include U.S. Pat. Nos. 643,608; 833,361; 3,928,771; 4,023,041; 4,034,231; 4,057,270 and 4,137,005. Each of these patents disclose a different way of generating usable energy from water currents. However, many of these devices are not capable of extracting energy from moving water regardless of the direction of movement of the water. Also, several of these devices are usable only for tidal movement whereas the present invention is usable for the extraction of energy from any type of water movement.

SUMMARY OF THE INVENTION

The present invention provides a folding wing design for a water turbine which is usable for the conversion of kinetic energy of moving water into an easily usable convenient form of electrical energy. To accomplish this purpose the turbine of the present invention includes a housing means which defines a generally cylindrical chamber means therein. The housing means will define a laterally extending opening in the side walls thereof to allow the moving water free entry and exit into the chamber defined within the housing means. In this manner the present invention will allow the usage of a single turbine to generate electricity regardless of the changes in direction of movement of the water in the surrounding environment.

A rotor means will be rotatably mounted within the chamber of the housing to provide the means for converting of the water moving through the chamber into an electrical current. Each rotor means includes a centrally located hub means which itself provides the location of rotatable securement of the rotor means to the housing. The rotor means further includes a plurality of vane means which extend radially outward from the hub means. The vane means are fixedly secured to the hub means and provide the surfaces against which the moving water will exert pressure to cause rotation of the rotor. Each of the vane means defines a propulsion side which is preferably concave and which is adapted to concentrate the flow of moving water against the vane to rotate the rotor means in the propelling or first direction. The other side of each vane means will be defined as a non-propulsion side which is usually convex and is adapted to dissipate rather than concentrate the force of moving water against this non-propulsion side of the vane to thereby prevent the exertion of force such as to cause rotation of the rotor in this opposite or second direction. If sufficient water pressure is exerted against the non-propulsion side of a vane, that vane will be capable of pivoting and collapsing against the adjacent vane to thereby completely prevent the exertion of any force against the rotor tending to move it in the non-propelling or second direction.

In particular, each vane means includes a first blade means which is fixedly secured with respect to the hub means to be rotatable therewith. Each vane means also includes a second blade means which is pivotally secured with respect to the first blade means and extends radially outward therefrom. The pivotal movement of the second blade means with respect to the first blade means is limited by a stop means. This stop means is positioned adjacent to the point of interconnection between the first blade and the second blade to thereby limit the distance of pivotal movement therebetween in the direction toward the non-propulsion side of the vane. In this manner this stop means will help rotation of the rotor means in the propelling direction. Each individual vane means also includes a biasing means which is attached to the first blade and the second blade and is adapted to apply a force to urge the second blade to pivot away from the propulsion side thereof toward the position of engagement with the stop. On the other hand, the biasing means facilitates rotation of the rotor means in the first or propelling direction.

To prevent contaminants from entering the pivotally engaging linkage of the first and second blades an outer covering means may extend over the location of pivotal engagement therebetween on the non-propulsion side thereof. Similarly, an inner covering means may extend over the location of pivotal engagement between the first blade and the second blade on the propulsion side thereof. Preferably, each of these covering means will be formed of an expandable resilient material such as to be stretchable during pivotal movement of the first blade with respect to the second blade. Also, the inner covering means will preferably be of a significantly resilient material such that it acts as the biasing means to apply a force to urge the second blade to pivot away from the propulsion side thereof toward the position of engagement with the stop. As a further protection a screen means may selectively be positioned extending over the entire lateral opening to prevent contaminants such as leaves or undersea growth from in any way inhibiting rotational movement of the rotor.

The stop means of each vane will preferably include a first abutment surface defined on the first blade means and a second abutment defined on the second blade means which are adapted to abut one another responsive to pivotal movement of the second blade means to a predetermined amount in the direction toward the non-propulsion side of the vane. The stop means in this orientation will thereby enhance movement of the rotor in the propelling direction. Once the stop means is locked in place, it can no longer rotate toward the convex or non-propelling side and in this manner all force being exerted thereagainst in the propelling direction will tend to be concentrated and enhance rotation in the powering direction.

Each vane means may further include a restriction means to limit the extent of pivotal movement of the first blade means with respect to the second blade means in the direction toward the propulsion side of the vane means. This will prevent overextension or compression of the biasing means.

In order to extract the rotational energy of the rotor which has been withdrawn from the kinetic energy of the waves an electrical generating means may be positioned such as to be driven by the rotation of the rotor. This can be of frictional engagement with respect to an upper shelf or the outer edge of the rotor or in any similar fashion such as to cause rotation of the armature of the electrical generating means.

It is an object of the present invention to provide a new and improved system for the generation of power from changeable water currents.

It is an object of the present invention to provide an improved generator means wherein the water currents or tidal flow are used to drive a rotatably mounted rotor.

It is an object of the present invention to provide a new and improved water turbine for utilizing sea currents and tidal flows as an energy source to provide a readily available cheap source of energy without the problems of environmental damage normally associated with power plants.

It is an object of the present invention to provide an improved water turbine wherein water currents or tidal flows are utilized to rotate a turbine of a novel configuration.

It is an object of the present invention to provide a water turbine for the generation of electrical current having a rotor which is rotatable in a single direction only.

It is an object of the present invention to provide a water turbine for the conversion of kinetic energy of moving water into electrical energy which includes a lateral opening adapted to withdraw the kinetic energy from moving water regardless of the direction of movement of the water.

It is an object of the present invention to provide a water turbine for the conversion of kinetic energy into electrical energy including a rotor having a plurality of concave propulsion sides and a plurality of convex non-propulsion sides.

It is an object of the present invention to provide a water turbine which does not utilize any inherent energy for the operation thereof and converts all the energy outside of minimal frictional losses into directly usable electrical energy.

It is an object of the present invention to provide a water turbine for the conversion of kinetic energy of moving water into electrical energy having a blade means forming a portion of each individual vane of each rotor wherein the blade means is itself pivotally movable with respect to the rotor to allow rotation in the propelling direction by the rotor and to prevent rotation of the rotor in the non-propelling direction.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a perspective view of an embodiment of the water turbine of the present invention shown in place in the ocean floor;

FIG. 2 is a cross-section of the embodiment of the water turbine device shown in FIG. 1 along lines 2—2;

FIG. 3 is a top plan view of an embodiment of a vane of a water turbine of the present invention;

FIG. 4 is a side view of the configuration of the vane shown in FIG. 3;

FIG. 5 is a showing of FIG. 2 with water shown moving in the downward direction; and FIG. 6 is a view as in FIG. 5 with the water shown moving in the opposite direction.

DETAILED DESCRIPTION OF THE PREFERRED EMBODIMENT

The present invention provides a water turbine 10 which is positionable directly upon an ocean floor or on any extremely solid supporting structure such as to be adjacent to the surface of moving water 12. The water will be allowed to pass through the turbine to cause rotation of rotor 34. An electrical generating means 14 may be positioned in abutment with a gear means 16 attached to rotor drive shaft 18 such that when the rotor means 34 is in motion the armature shaft of the electrical generating means 14 will be caused to rotate and create a usable electrical energy from the moving water which is rotating rotor means 34.

The present invention provides a novel construction for the water turbine 10 including a housing means 20 defining a generally cylindrical chamber means 22 therein. The chamber means is adapted to receive the inflow and outflow of moving water therethrough. The rotor means 34 is pivotally mounted within the chamber means such as to be driven by this moving water. The vertical dimension of the rotor may be the entire vertical dimension of the chamber, however, more preferably, the rotor will extend downwardly only throughout a portion thereof to allow the swirling water to more freely enter the chamber and drive the rotor. In order to allow the water to flow in and out of the chamber, means 22 is formed with a laterally extending opening 26. The laterally extending opening 26 will make the rotor 34 capable of movement resulting from the force of water moving in any direction in the immediately adjacent environment to the position of the turbine 10. The moving water shown by arrows 32 and 33 in FIGS. 5 and 6 will exert pressure on the rotor to cause rotation thereof. This pressure will tend to be concentrated in the propelling direction of the rotor as will be explained here below.

The configuration of the rotor 34 includes a hub means 36 which itself is rotatably mounted to the housing means 20. This hub means includes a plurality of vane means 38 extending outwardly therefrom and being adapted to be driven by the pressure of the moving water passing through the opening 26. For this purpose each vane means includes a propulsion side 40 which is usually concave to concentrate the water pressure thereagainst. Each vane means 38 also includes a non-propulsion side 42 which is generally convex in order to dissipate any forces exerted by moving water thereagainst. In this manner all the propulsion sides 40 of the vane means 38 are oriented in the same rotational direction with respect to one another to cause rotation of the rotor means 34 in the propelling direction.

To further insure the movement of the rotor means 34 in the propelling direction each vane means 38 is comprised of a first blade means 44 and a second blade means 46. The first blade means 44 is fixedly secured with respect to the hub means 36. The second blade means 46 is pivotally secured with respect to the first blade means 44 and extends outwardly therefrom. The second blade means is freely pivotally movable with respect to the first blade means toward the propulsion side thereof. On the other hand the second blade means has limited pivotal movement with respect to the first blade means on the non-propulsion side thereof. To limit this movement each vane means 38 will include a stop means 48 which preferably is formed as a first abutment surface 64 on the first blade means and a second abutment surface 66 on the second blade means. These abutment surfaces are adapted to abut one another responsive to force on the second blade means toward the non-propulsion side thereof.

Each vane means will preferably also include a biasing means 52 which is adapted to generally bias the first blade means 44 to pivotal movement toward the non-propelling side thereof. This biasing means may preferably take the form of an inner resilient covering means 60 as shown in FIGS. 3 and 4. As shown in FIG. 3 the pivotal movement of the first blade means 44 with respect to the second blade means 46 toward the non-propulsion side thereof is shown by arrow B whereas pivoting toward the propulsion side is shown by arrow A.

Furthermore, as shown in FIGS. 3 and 4 it is desirable to minimize contaminants from contacting the pivotal engagement between the first blade means 44 and the second blade means 46. This insulation is achieved by the preferable inclusion of an outer covering means 58 extending over the pivotal connection between the two blade means on the non-propulsion side thereof. Also an inner covering means 60 which also functions of the biasing means 52 is shown fixedly secured to the first blade means 44 and the second blade means 46 on the propulsion side thereof. Preferably each of these covering means are made of expandable resilient material such that the complete covering will be maintained regardless of the pivotal movement between the two blade means. Furthermore, it may be desirable to limit the pivotal movement of the second blade means toward the propelling side of the vane means 38 and this can be achieved by a restriction means 50 which similarly comprises two abutment surfaces. However, this restriction means would of necessity require a larger degree of pivotal movement therebetween than is allowed by the stop means 48. This necessity will be explained below when the operation of the water turbine 10 of the present invention is disclosed. To further minimize the flow of contaminants into the chamber, a screen means 24 may extend over the laterally extending opening 26 to prevent seaweed or other articles from clogging the movement path of rotor 34.

To facilitate placement of this device on the ocean floor, a plurality of legs 28 may be secured to the lower platform area thereof. The legs preferably would be adjustable as to height in order to orient the water level to be approximately equal to the upper surface of rotor 34.

In operation of the present invention water will be admitted into the chamber means 22 through opening 26. This moving water will travel along the lines shown by arrow 32 and will concentrate on the propulsion sides 40 of vane means 38 and will be dissipated on the non-propulsion side 42 of vane means 38.

To further minimize force exerted in the non-propulsion direction the second blade means 46 will tend to collapse against the adjacent blade means and prevent any force being exerted in this non-propelling direction. This folding wing design is shown in the left portion of FIG. 5 of the water traveling in as shown by arrow 32. Furthermore this collapsing is shown in the right side of FIG. 6 with the water traveling in the out direction 33. With each configuration the rotor will be caused to poperate in the clockwise or propelling direction.

The present invention is particularly useful in tidal waters or in areas where wave motion is constant. The usage of this configuration in such an area is best shown in FIGS. 5 and 6. FIG. 5 shows a wave or tide moving in with the water moving in the direction shown by arrows 32. On the left hand side of the Figure the second blade means or wings will tend to fold against an adjacent wing. The leftmost wing is shown completely folded. On the other hand, in the right side of FIG. 5 the stop means 48 will hault movement of the folding wing downwardly and will cause a propelling force to be exerted thereagainst causing rotation in the clockwise direction. In FIG. 6 a similar rotation is created on opposite sides since the water is moving in an out direction as shown by arrows 33. In this manner opposite to that shown in FIG. 5 on the left the propelling forces will be exerted against the propelling side of the vanes. On the other and, on the right hand side in FIG. 6 the second blade means will be caused to collapse against adjacent vanes. In this manner the folding on the right hand side and the concentration of force on the left hand side will in an opposite manner cause a rotation exactly the same as is in FIG. 5. With this configuration we see that whether the direction of water movement is from the top or the bottom or even from the right or the left the vane will continue to rotate in a clockwise direction. The folding wing design is particularly advantageous since it decreases the resistance to water flow in the non-propelling direction and yet increases the resistance to water flow in the propelling direction. This difference in resistance to water flow causes a resultant force to be exerted in the propelling direction causing the generation of electrical energy at all times with any water movement in the general area of this water turbine.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A water turbine for the conversion of the kinetic energy of moving water into electrical energy comprising:
   (a) a housing means defining a generally cylindrical chamber means therein, said housing means further defining a laterally extending opening therearound to allow fluid flow communication with moving water;
   (b) a rotor means being rotatably mounted within said chamber means of said housing means, said rotor means comprising:
   1. a hub means rotatably secured to said housing means; and
   2. a plurality of vane means extending radially outwardly from said hub means and fixedly secured with respect thereto, each of said vane means defining a propulsion side adapted to concentrate the force of moving water against said vane and to rotate said rotor means in a first propelling direction and a non-propulsion side adapted to dissipate the force of moving water against the other side of said vane to prevent rotation of said rotor means in the opposite second non-propelling direction, said vane means further comprising:
      (i) a first blade means fixedly secured with respect to said hub means to be rotatable therewith;
      (ii) a second blade means being pivotally secured with respect to said first blade means and extending radially outward therefrom to be engageable with respect to an adjacent vane means responsive to a predetermined force being exerted on said vane means in the second non-propelling direction;
      (iii) a stop means positioned adjacent said first blade means and said second blade means to limit the distance of rotational movement therebetween toward said non-propulsion side thereof; and
      (iv) a resilient biasing means attached to said first blade means and said second blade means and adapted to apply a force to urge the second blade means to rotate away from said propulsion side thereof toward the position of engagement of said stop means to facilitate rotation of said rotor means in the first direction.

2. The water turbine as defined in claim 1 further comprising an outer means extending over the location of pivotal engagement between said first blade means and said second blade means on said non-propulsion side thereof.

3. The water turbine as defined in claim 1 further comprising an inner covering means extending over the location of pivotal engagement between said first blade means and said second blade means on said propulsion side thereof.

4. The water turbine as defined in claim 3 wherein said inner covering means comprises said biasing means.

5. The water turbine as defined in claim 2 wherein said outer covering means comprises an expandable resilient material fixedly secured at one end to said first blade means on the non-propulsion side thereof and fixedly secured at the other end to said second blade means on the non-propulsion side thereof.

6. The water turbine as defined in claim 3 wherein said inner covering means comprises an expandable resilient material fixedly secured at one end to said first blade means on the propulsion side thereof and fixedly secured at the other end to said second blade means on the propulsion side thereof.

7. The water turbine as defined in claim 1 wherein said stop means further comprises a first abutment surface on said first blade means and a second abutment surface on said second blade means adapted to abut one another responsive to a pre-determined amount of pivotal movement of said second blade means toward said non-propulsion side vane means to limit such pivotal movement.

8. The water turbine as defined in claim 1 further comprising a restriction means to limit the pivotal movement of said first blade means with respect to said second blade means in the direction towards said propulsion side of said vane means.

9. The water turbine as defined in claim 1 wherein said propulsion side of said vane means is concave.

10. The water turbine as defined in claim 1 wherein said non-propulsion side of said vane means is convex.

11. The water turbine as defined in claim 1 further comprising an electrical generating means in abutment with said rotor to be driven thereby.

12. A water turbine for the conversion of the kinetic energy of moving water into electrical energy comprising:
   (a) a housing means defining a generally cylindrical chamber means therein, said housing means further defining a lateral extending opening therearound to allow fluid flow communication with moving water;
   (b) a rotor means being rotatably mounted within said chamber means of said housing means, said rotor means comprising:
   1. a hub means rotatably secured to said housing means; and
   2. a plurality of vane means extending radially outwardly from said hub means and fixedly secured with respect thereto, each of said vane means defining a proulsion side which is concave and is adapted to concentrate the force of moving water against said vane and to rotate said rotor means in a first propelling direction and a non-propelling side which is convex and is adapted to dissipate the force of moving water against the other side of said vane to prevent rotation of said rotor means in the opposite second direction, said vane means further comprising:
      (i) a first blade means fixedly secured with respect to said hub means to be rotatable therewith; and
      (ii) a second blade means being pivotally secured with respect to said first blade means and extending radially outward therefrom to be selectively engageable with respect to an adjacent vane means responsive to a predetermined force being exerted on said vane means in the second non-propelling direction;
      (iii) a stop means positioned adjacent said first blade means and said second blade means to limit the distance of rotational movement therebetween toward said non-propulsion side thereof, said stop means actually comprising a first abutment surface on said first blade means and a second abutment surface on said second blade means adapted to abut one another responsive to a predetermined amount of pivotal movement of said second blade means toward said non-propulsion side of said vane means to limit such pivotal movement;

(iv) a biasing means comprising a flat spring means being secured with respect to said second blade means and with respect to said first blade means to apply a force to urge said second blade means to rotate away from said propulsion side thereof toward the position of engagement of said stop means;

(v) an outer covering means extending over the location of pivotal engagement between said first blade means and said second blade means on said non-propulsion side thereof;

(vi) an inner covering means extending over said biasing means and the location of pivotal engagement between said first blade means and said second blade means on said propulsion side thereof and said inner covering means including a biasing means attached to said first blade means and said second blade means and adapted to apply a force to urge said second blade means to rotate away from said propulsion side thereof toward the position of engagement of said stop means and to allow rotation of said rotor means in the first propelling direction;

(vii) a restriction means to limit the pivotal movement of said first blade means with respect to said second blade means in the direction toward said propulsion side of said vane means.

* * * * *